(12) United States Patent
Smith

(10) Patent No.: US 10,584,673 B2
(45) Date of Patent: Mar. 10, 2020

(54) TURBINE FOR EXTRACTING KINETIC ENERGY FROM FLOWING FLUID, AND RELATED METHODS AND SYSTEMS

(71) Applicant: Soar Technologies, Inc., Redmond, WA (US)

(72) Inventor: Nathan J. Smith, Duvall, WA (US)

(\*) Notice: Subject to any disclaimer, the term of this patent is extended or adjusted under 35 U.S.C. 154(b) by 344 days.

(21) Appl. No.: 15/325,979

(22) PCT Filed: Jun. 1, 2016

(86) PCT No.: PCT/US2016/035252
§ 371 (c)(1),
(2) Date: Jan. 12, 2017

(87) PCT Pub. No.: WO2017/196376
PCT Pub. Date: Nov. 16, 2017

(65) Prior Publication Data
US 2018/0209395 A1    Jul. 26, 2018

Related U.S. Application Data

(60) Provisional application No. 62/333,474, filed on May 9, 2016.

(51) Int. Cl.
*F03B 3/02* (2006.01)
*F03B 11/02* (2006.01)

(52) U.S. Cl.
CPC ............... *F03B 3/02* (2013.01); *F03B 11/02* (2013.01); *F05B 2210/403* (2013.01); *F05B 2240/121* (2013.01); *Y02E 10/223* (2013.01); *Y02E 10/226* (2013.01)

(58) Field of Classification Search
CPC .. F03B 3/02; F03B 11/02; F03B 15/06; F03B 3/186; Y02E 10/223; Y02E 10/226; F05B 2210/403; F05B 2240/121; F02B 37/18
See application file for complete search history.

(56) References Cited

U.S. PATENT DOCUMENTS

| | | | |
|---|---|---|---|
| 1,609,306 A | 12/1926 | Peterson | |
| 2,127,602 A | 8/1938 | Jessop | |
| 2,516,822 A | 7/1950 | Yates | |
| 2,621,483 A | 12/1952 | Kalix | |
| 2,694,365 A * | 11/1954 | Armstrong | F04D 1/066 417/81 |
| 3,436,055 A | 4/1969 | Lindquist | |

(Continued)

FOREIGN PATENT DOCUMENTS

| | | | | |
|---|---|---|---|---|
| GB | 2507044 A * | 4/2014 | | F03B 13/00 |
| WO | WO-2008071592 A1 * | 6/2008 | | F04D 1/063 |

*Primary Examiner* — Moshe Wilensky
*Assistant Examiner* — Andrew Thanh Bui

(57) ABSTRACT

A turbine for extracting kinetic energy from a fluid includes a runner, a turbine-inlet having an entrance and an exit that is adjacent the turbine's runner, and a turbine-outlet having an entrance that is adjacent the runner and an exit. The runner extracts kinetic energy from fluid flowing through the turbine; the turbine inlet directs flowing fluid into the runner; and the turbine-outlet directs flowing fluid away from the runner. When fluid flows through the turbine, the fluid flowing through the turbine-inlet toward the runner flows around and adjacent the fluid flowing through the turbine-outlet away from the runner.

23 Claims, 11 Drawing Sheets

(56) References Cited

U.S. PATENT DOCUMENTS

| | | | |
|---|---|---|---|
| 4,674,279 A | 6/1987 | Ali et al. | |
| 5,864,183 A * | 1/1999 | Fisher, Jr. | F03B 13/06 290/40 C |
| 2009/0095436 A1 * | 4/2009 | Pessin | B22D 19/16 164/95 |
| 2015/0121868 A1 | 5/2015 | Fryrear et al. | |

* cited by examiner

TURBINE FOR EXTRACTING KINETIC ENERGY FROM FLOWING FLUID, AND RELATED METHODS AND SYSTEMS

CROSS REFERENCE TO RELATED APPLICATION AND CLAIM OF PRIORITY

This application claims priority from the commonly owned U.S. Provisional Patent Application No. 62/333,474 filed 9 May 2016, and titled "A Turbine For Extracting Kinetic Energy From Flowing Fluid, And Related Methods And Systems", incorporated by reference.

BACKGROUND

Fluid distribution networks are used in a variety of applications to distribute fluid from a central reservoir to one or more remote locations where the fluid is available for use. Typically, one or more main transmission lines convey the fluid from the reservoir to one or more branch transmission lines that, in turn, convey the fluid to a respective one or more remote locations. Because most remote locations are designed to operate with a fluid having specific flow characteristics such as pressure and/or flow rate, the fluid-distribution network is designed to distribute more fluid than all the remote locations can simultaneously consume. Furthermore, the fluid distribution network is designed to provide the maximum amount of fluid at a pressure significantly higher than the highest design pressure of all the remote locations. Consequently, fluid-distribution networks typically include pressure-reducing valves to reduce the pressure and flow rate of the fluid before the fluid reaches the remote locations.

For example, a typical water-distribution system used by a city to supply water for commercial and residential use includes one or more main water lines that convey water from a local reservoir or pump station to zones within the city. Each zone typically includes a secondary water line that conveys the water from the main lines to neighborhoods within the zone. And each neighborhood typically includes a consumer distribution line that conveys the water from the secondary lines to the individual consumers within the neighborhood. The design pressure of the fluid received by the individual consumer is typically 40 pounds per square inch (psi) while the design pressure of the fluid in the main water lines is typically 300 psi. Consequently, pressure reducing valves are typically placed at the junctions of the main and secondary water lines and at the junctions of the secondary water lines and the consumer distribution lines. Pressure reducing valves, however, may also be placed within the main, secondary or consumer distribution lines.

FIG. 1 is a cut-away view of a conventional pressure reducing valve 10 incorporated in a typical fluid distribution network (omitted from FIG. 1 for clarity). The valve 10 includes an inlet portion 12 for receiving fluid having an inlet pressure, an outlet portion 14 for discharging fluid having a discharge pressure that is less than the inlet pressure, and a gate assembly 16 for regulating the amount of fluid allowed to flow from the inlet portion 12 to the outlet portion 14. The gate assembly 16 includes a piston 18 that can be moved relative to a piston seat 20 to increase or decrease the amount of fluid allowed to flow from the inlet portion 12 to the outlet portion 14. Even when the piston 18 is fully open, the amount of fluid allowed to flow into the outlet portion 14 is less than the amount of fluid that would normally flow through a transmission line without the valve 10. As the piston 18 closes, (moves toward the seat 20) the amount of fluid allowed to flow into the outlet portion 14 from the inlet portion 12 is reduced even further. Consequently, the valve 10 reduces the pressure of the fluid flowing out of the outlet portion 14 by reducing the amount of fluid flowing through the valve 10.

Because the valve 10 reduces the amount of fluid flowing from the inlet portion 12 to the outlet portion 14, the inlet pressure causes the flow velocity of the fluid flowing between the piston 18 and the piston seat 20 to increase with respect to the velocity of the fluid into the inlet portion 12. The flow velocity, and thus the flow energy of the fluid discharged from the outlet 14 is then reduced by turbulence that is generated within the flow as the fluid flows away from the valve 10, by changes in the direction of the flow as the fluid proceeds through the network, and by friction between the interior walls of the transmission lines and the fluid.

Unfortunately, reducing the flow velocity by these means does not allow one to capture the energy released from the flow in a readily usable form. If the fluid-distribution network includes many valves for reducing pressure, the total amount of energy released by the aggregate pressure reduction can be significant.

Thus, there is a need for a device that can reduce fluid pressure and use the released energy to generate power.

SUMMARY

In one aspect of the invention, a turbine for extracting kinetic energy from a fluid includes a runner, a turbine-inlet having an entrance and an exit that is adjacent the turbine's runner, and a turbine-outlet having an entrance that is adjacent the runner and an exit. The runner extracts kinetic energy from fluid flowing through the turbine; the turbine inlet directs flowing fluid into the runner; and the turbine-outlet directs flowing fluid away from the runner. When fluid flows through the turbine, the fluid flowing through the turbine-inlet toward the runner flows around and adjacent the fluid flowing through the turbine-outlet away from the runner.

By configuring the turbine-inlet to direct the fluid flowing toward the turbine's runner to flow around and adjacent the fluid flowing away from the turbine's runner, the entrance of the turbine-inlet and the exit of the turbine-outlet may be aligned and close to each other. In this configuration, the turbine may be quickly and easily added to a pipe that carries fluid within any distribution system or toward any specific location to extract energy that otherwise would be wasted. Also, in this configuration, a generator may be coupled directly to the turbine runner to avoid transmitting the rotation of the runner through one or more gears to the generator, which can reduce the amount of power generated by the generator. In addition, the turbine may be configured to use a variety of different runners, each designed to reduce the pressure in the fluid by a specific amount while efficiently extracting kinetic energy from the fluid. In this manner, one may replace the turbine's runner in response to a desired change in the fluid's pressure at the turbine-outlet's exit, or to a change in the desired amount of power to be generated by the turbine.

Figure 5:
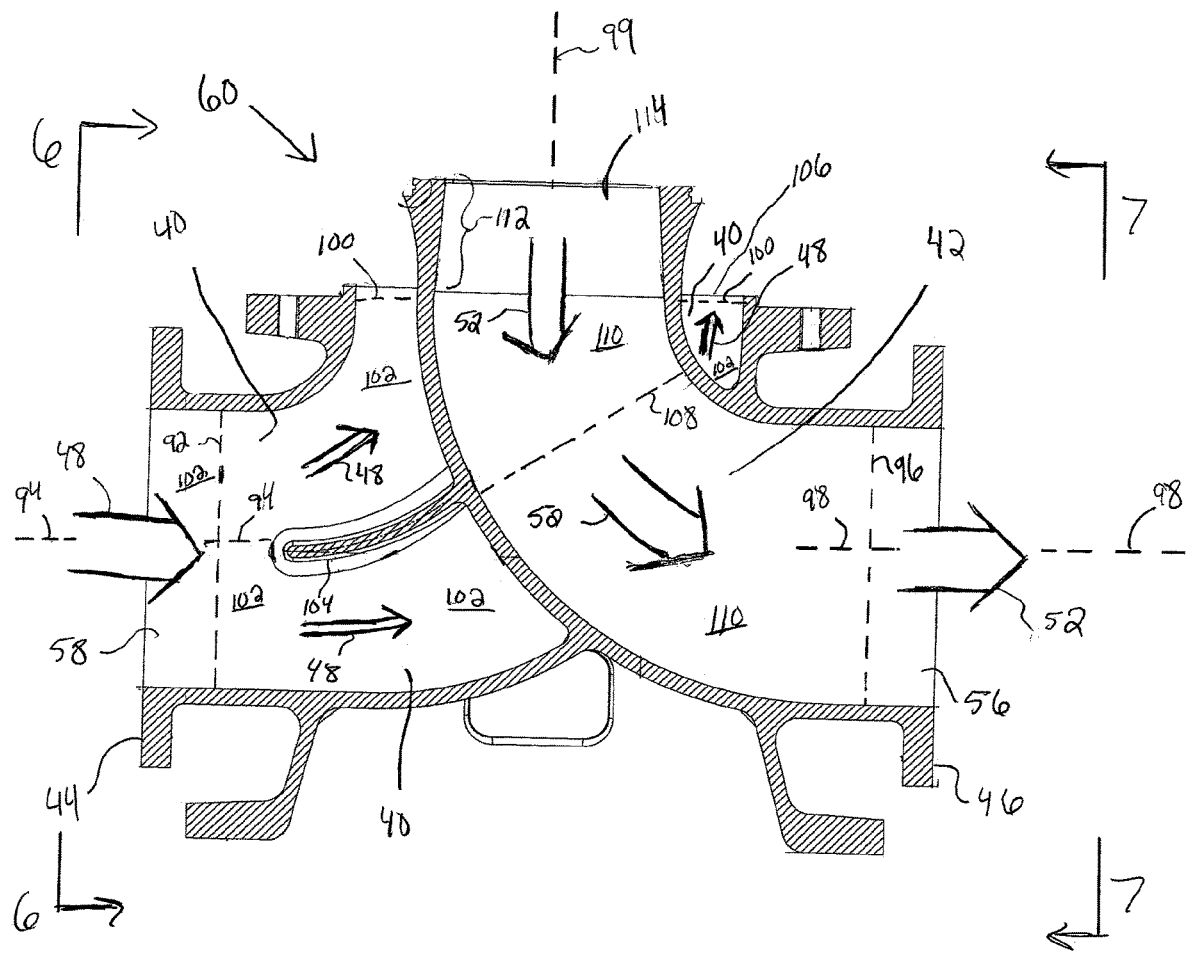
FIG. 5 shows a view of a base component of the turbine shown in FIGS. 3 and 4, according to an embodiment of the invention.
Figure 6:
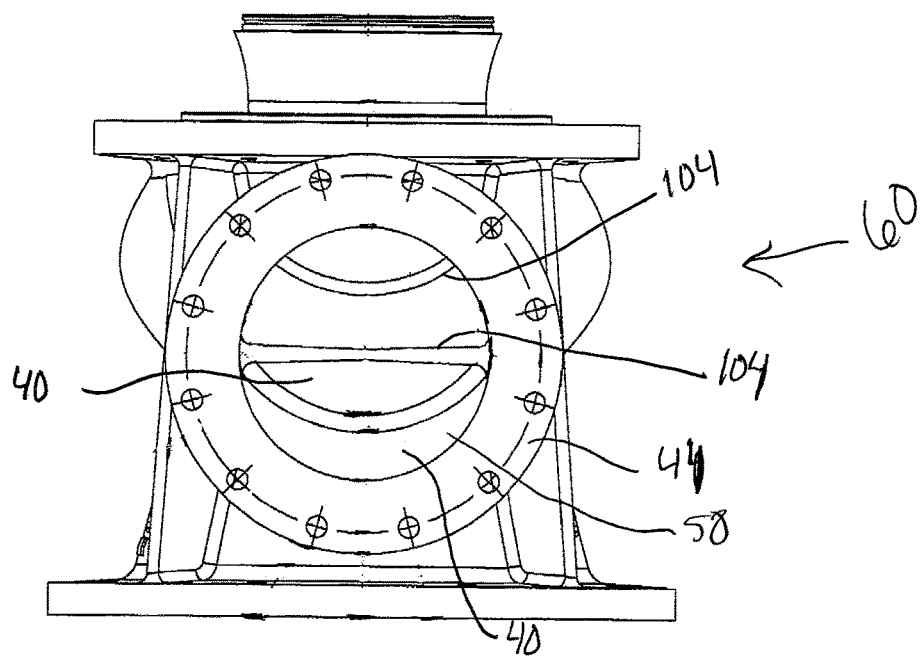
FIG. 6 shows another view of the base component shown in FIG. 5, according to an embodiment of the invention.
Figure 7:
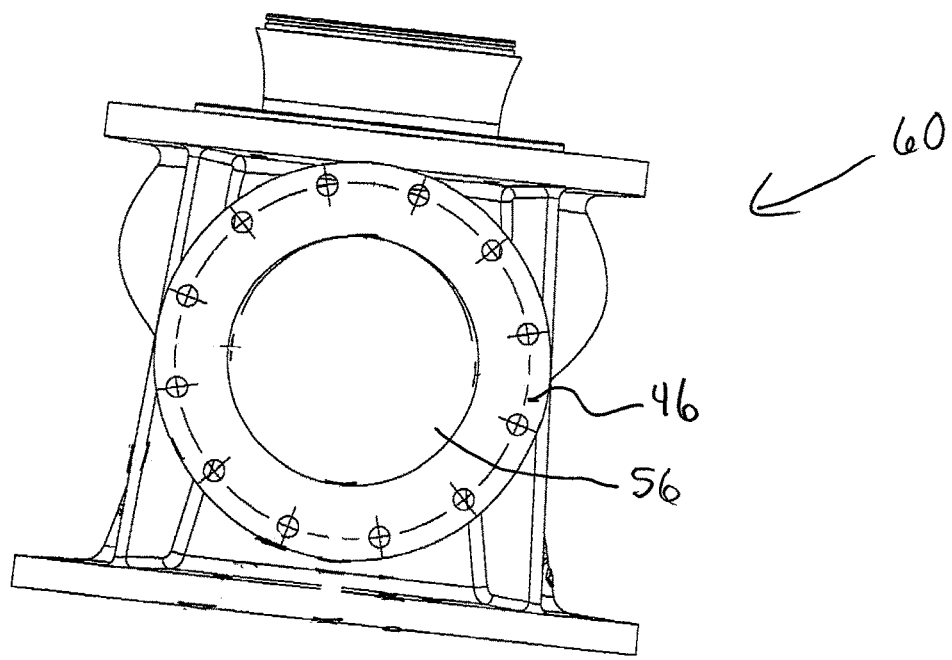
FIG. 7 shows a cross-sectional view of the base component shown in FIGS. 5 and 6, according to an embodiment of the invention.
Figure 8A:
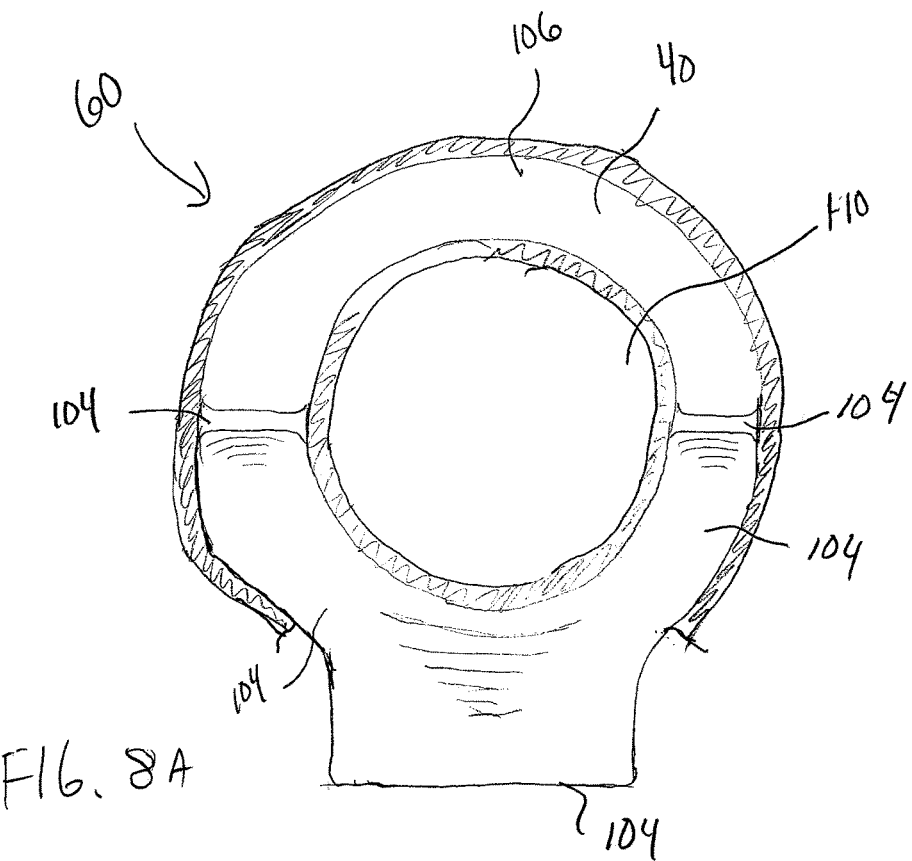
Figure 8B:
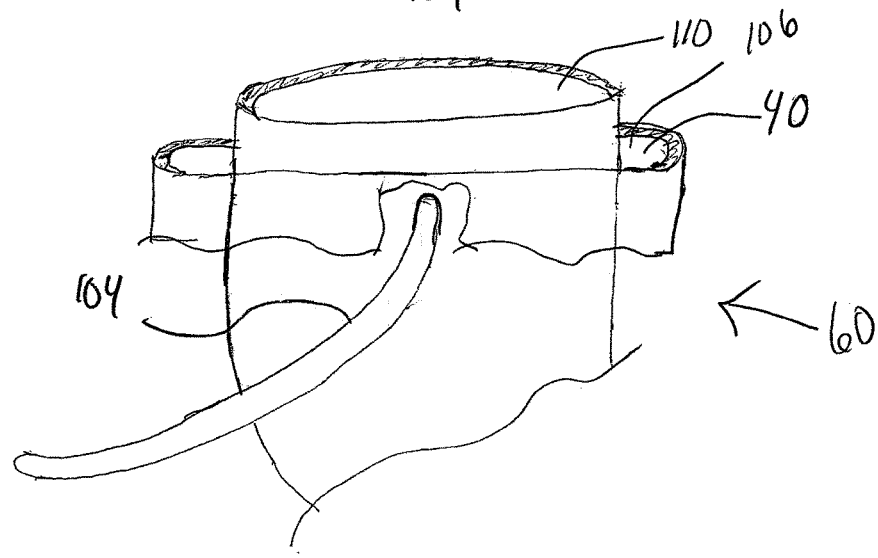

Each of FIGS. 8A and 8B shows a partial, cross-sectional view of the base component shown in FIGS. 5-7, according to an embodiment of the invention.

Figure 3:
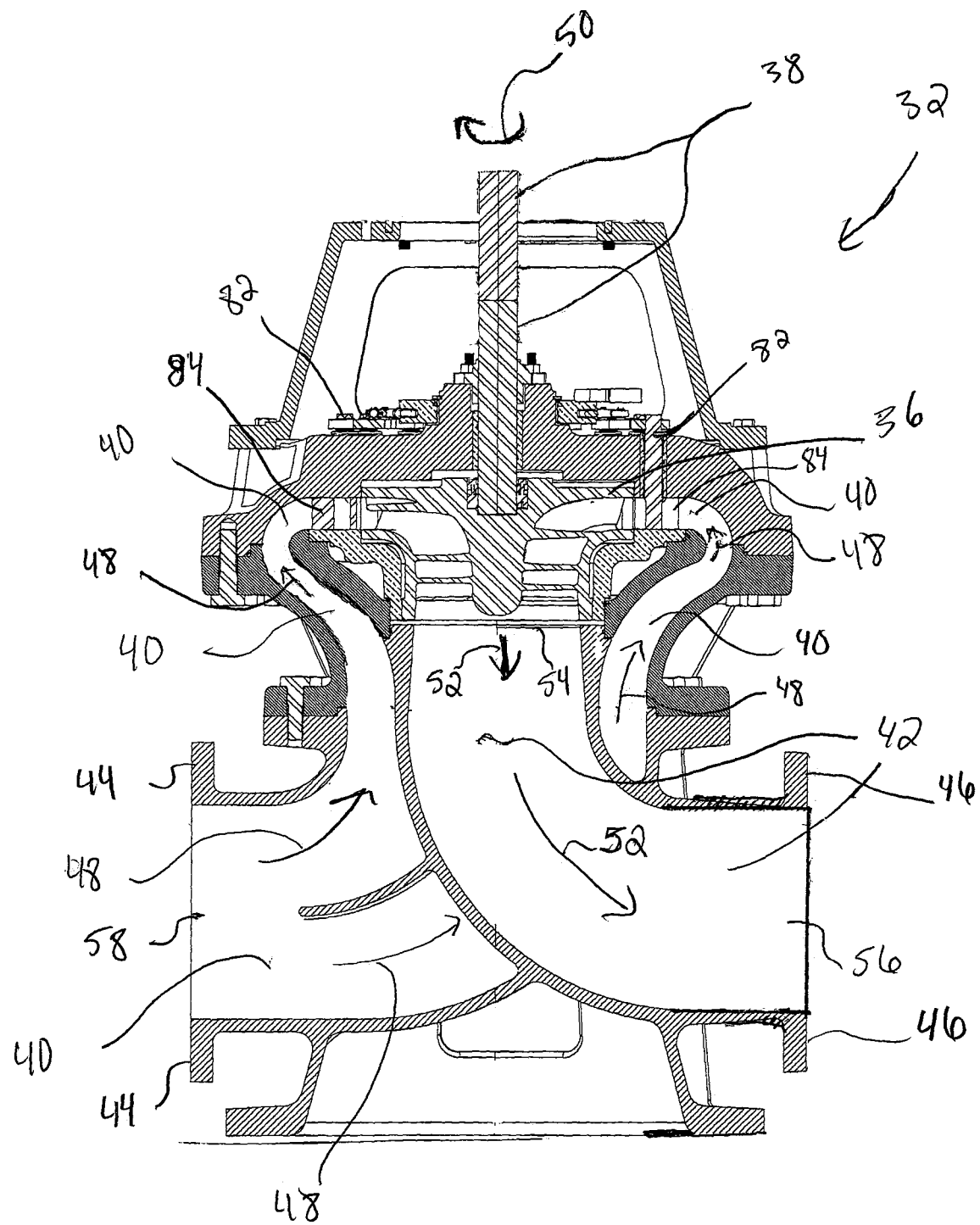
FIG. 3 shows a cross-sectional view of a turbine of the system shown in FIG. 2, according to an embodiment of the invention.
Figure 4:
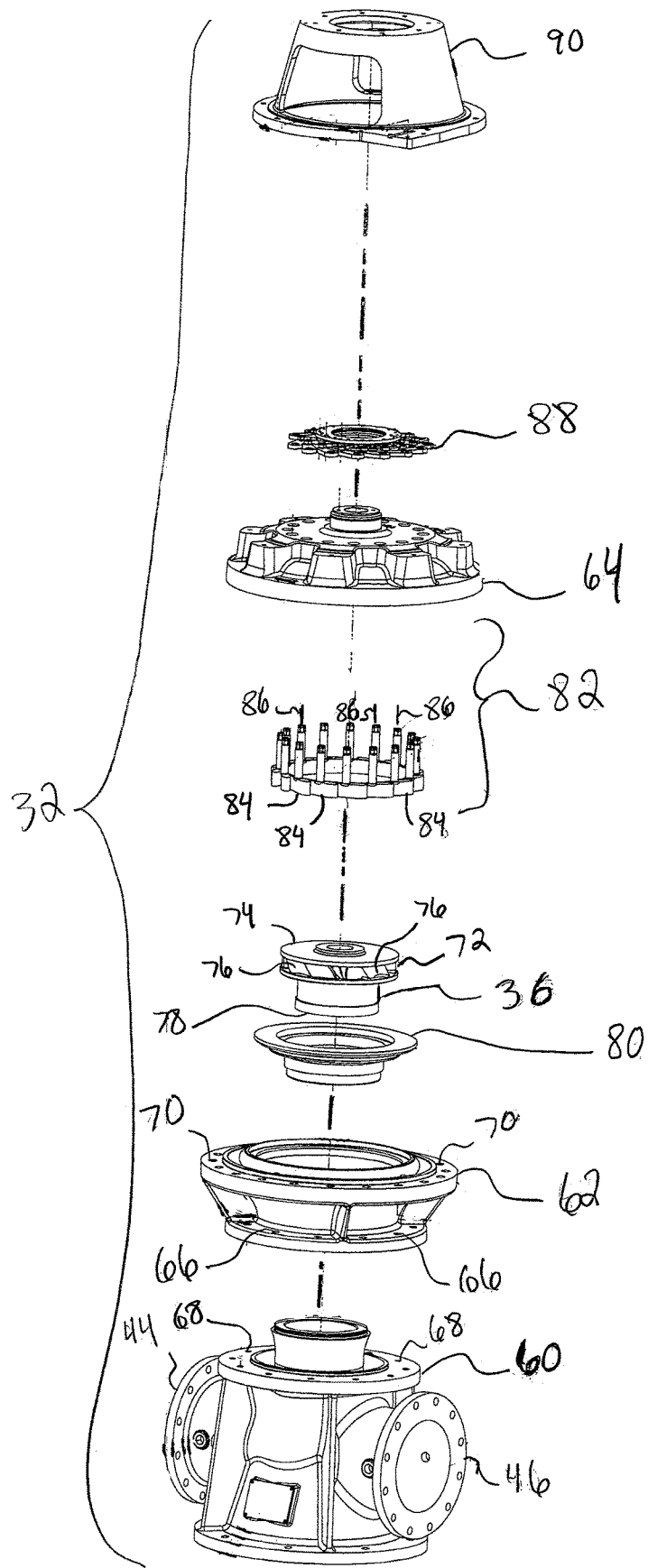
FIG. 4 shows an exploded, perspective view of the turbine shown in FIG. 3, according to an embodiment of the invention.
Figure 9:
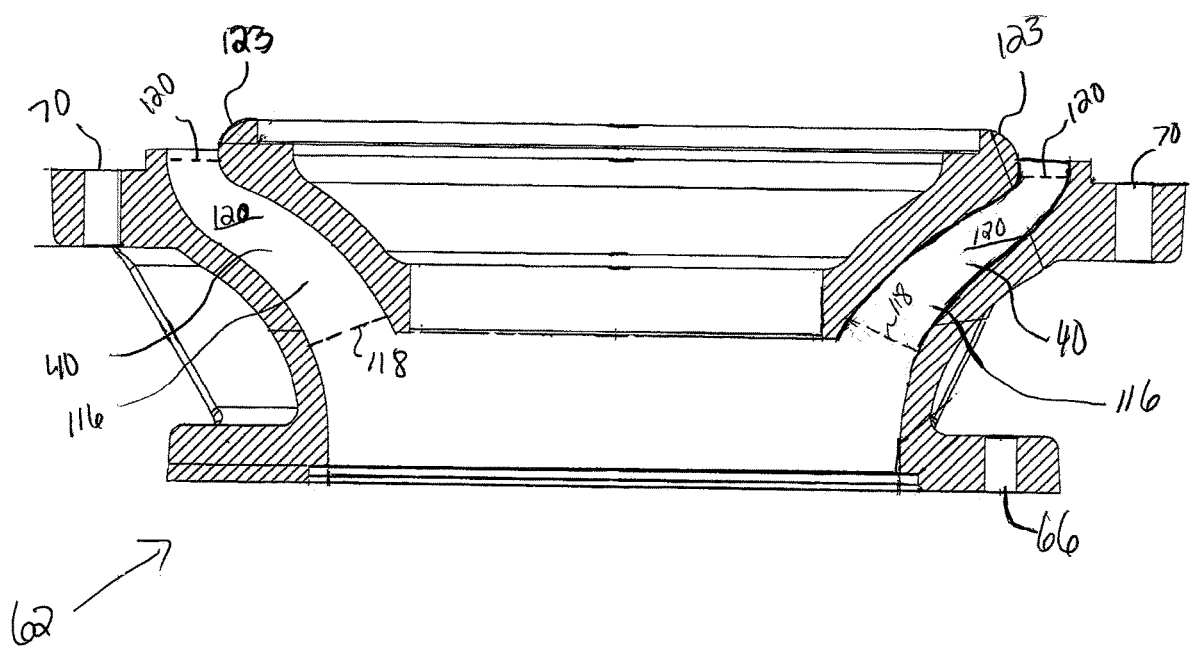

FIG. 9 shows a cross-sectional view of a case component of the turbine shown in FIGS. 3 and 4, according to an embodiment of the invention.

Figure 10:
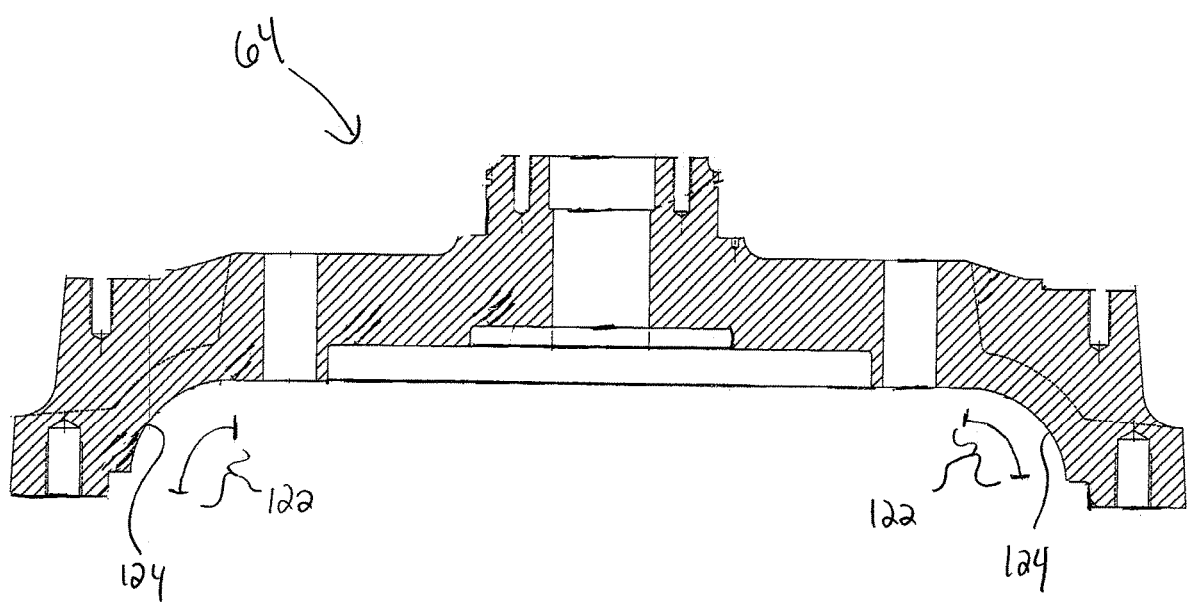

FIG. 10 shows a cross-sectional view of a cover component of the turbine shown in FIGS. 3 and 4, according to an embodiment of the invention.

Figure 11:
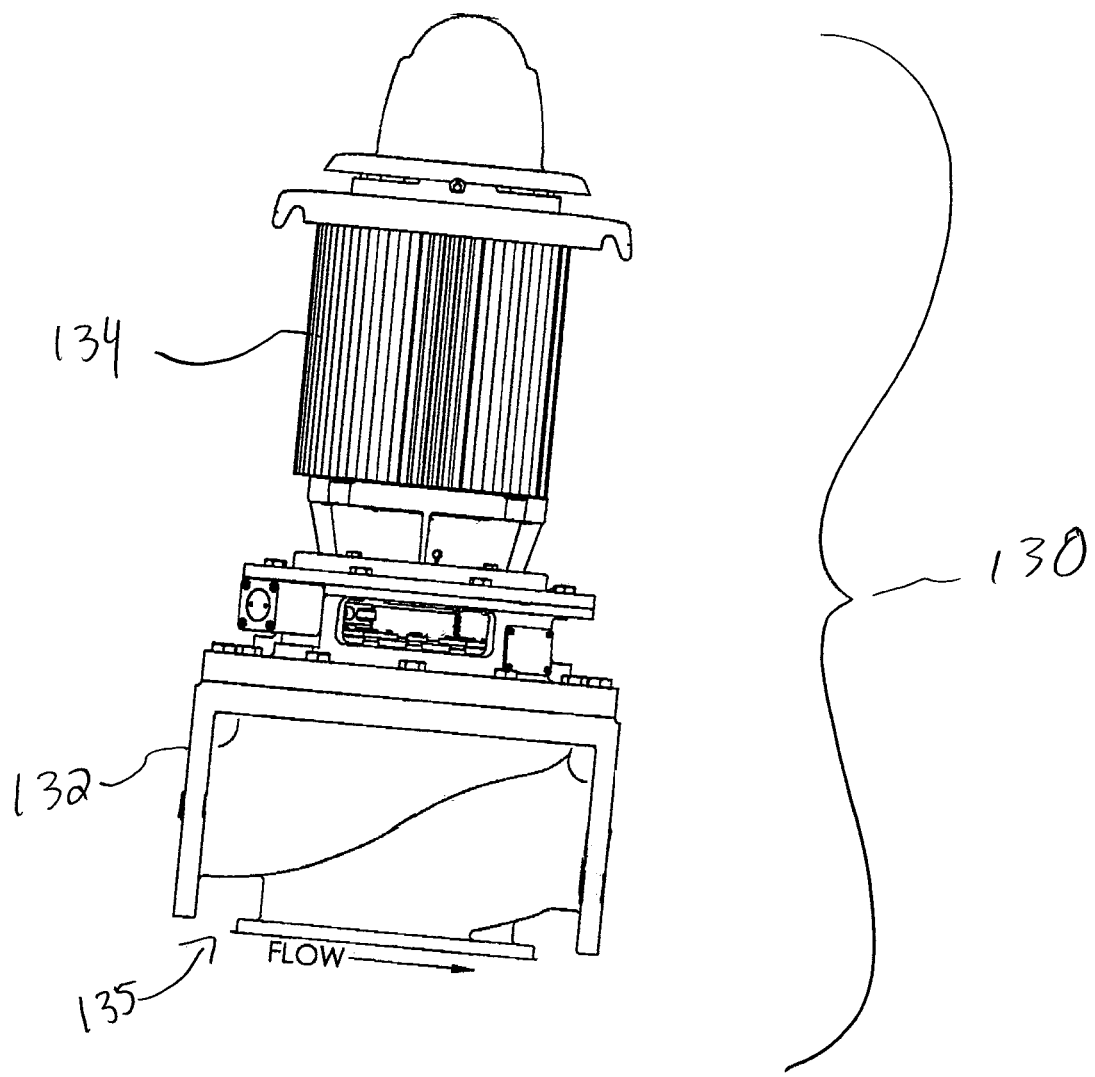

FIG. 11 shows a view of another system, according to another embodiment of the invention.

Figure 12:
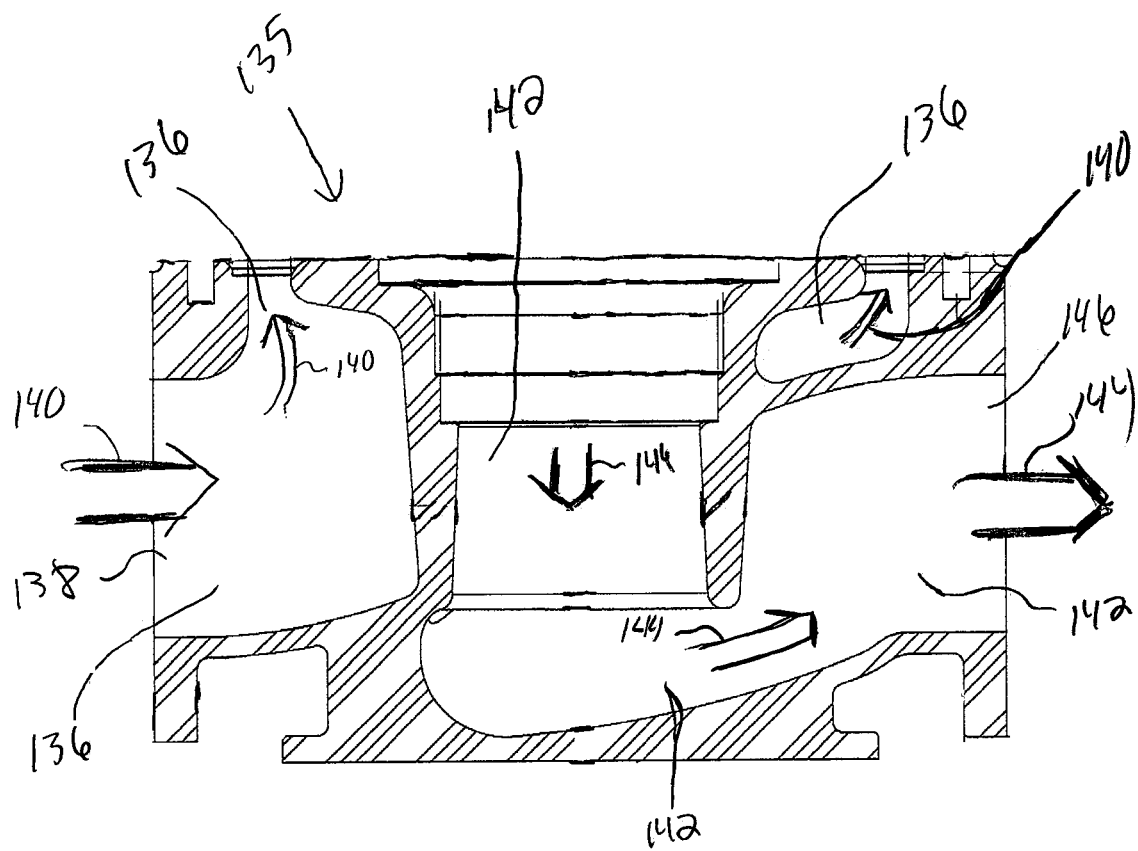

FIG. 12 shows a view of a base component of the turbine of the system shown in FIG. 11, according to an embodiment of the invention.

DETAILED DESCRIPTION

Figure 1:
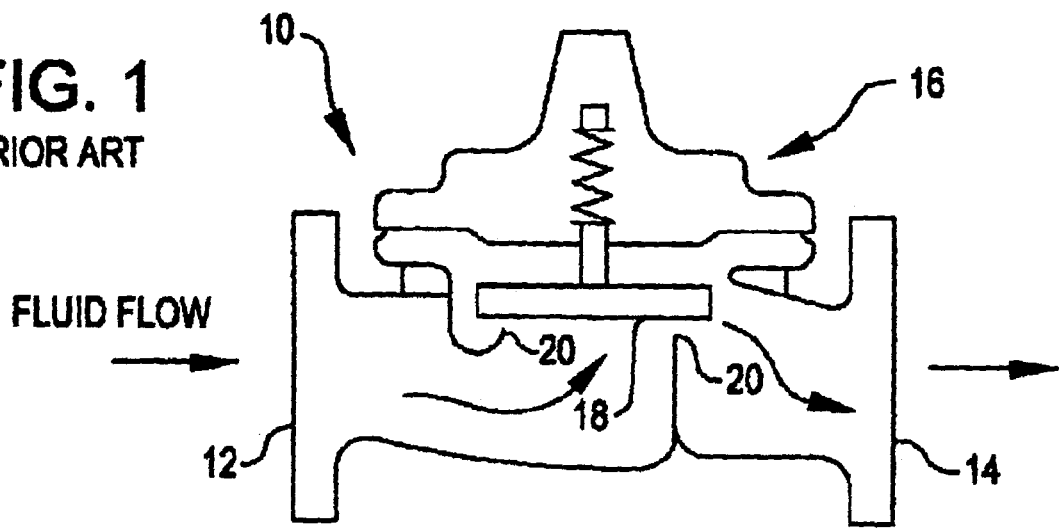
FIG. 1 shows a cutaway view of a conventional valve for reducing pressure.
Figure 2:
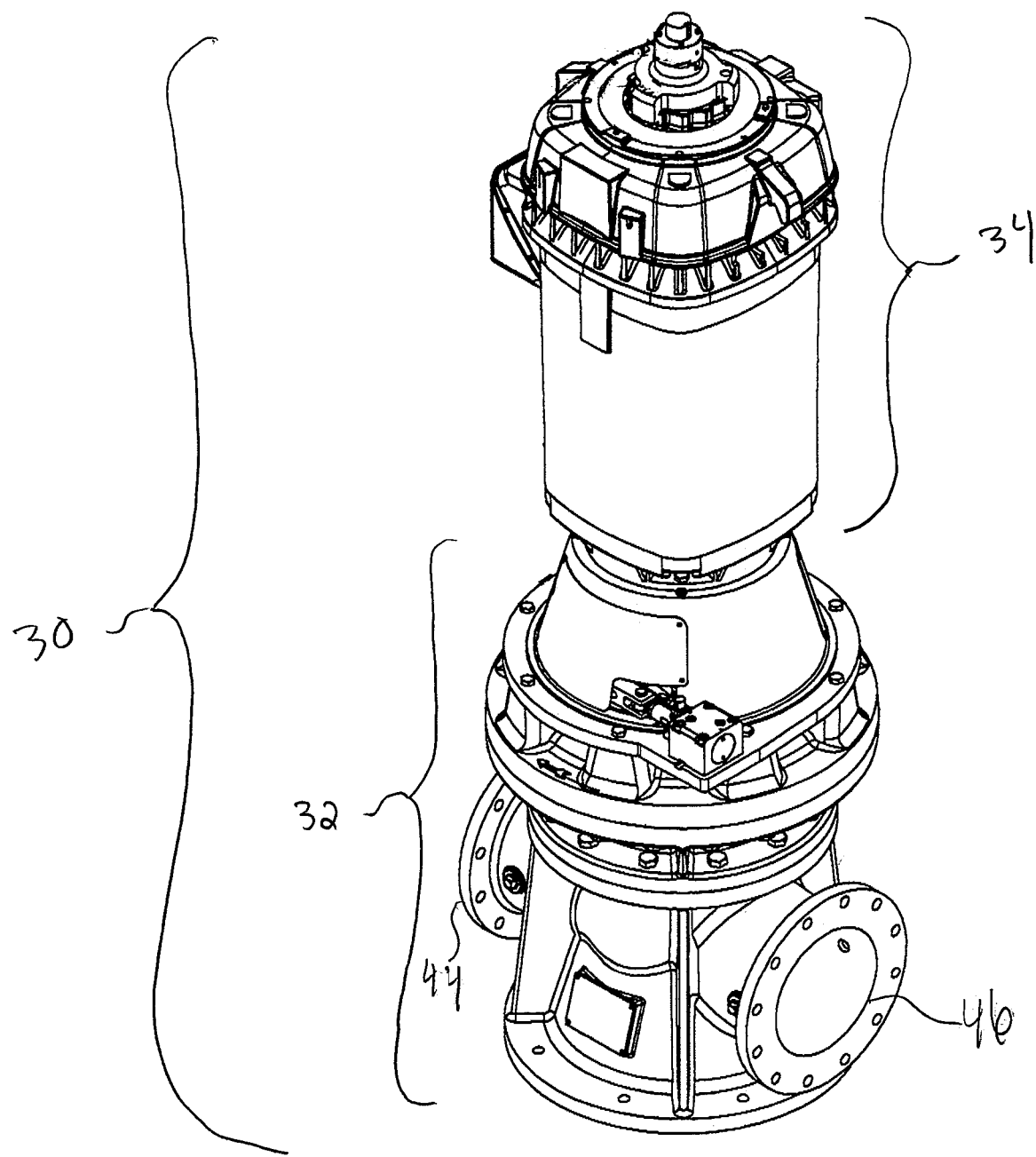
FIG. 2 shows a perspective view of a system, according to an embodiment of the invention.

FIG. 2 shows a perspective view of a system 30, according to an embodiment of the invention. FIG. 3 shows a cross-sectional view of a turbine 32, according to an embodiment of the invention, that the system 30 includes. The system 30 also includes a generator 34. Although, the system 30 is shown with the turbine 32 and generator 34 vertically aligned, the turbine 32 and generator 34 may be horizontally aligned or aligned at any angle between the two. When fluid (not shown) flows through the system 30, the turbine 32 extracts kinetic energy from the flow, and the generator 34 converts the extracted energy into an electric potential, which may be used to provide direct current or alternating current. The fluid may be any desired fluid. For example, the fluid may be pressurized natural gas, air, steam, water and/or oil. Here, the turbine 32 is configured to extract kinetic energy from water flowing through the system 30. The turbine 32 includes a runner 36 (FIG. 3) that contacts fluid flowing through the turbine 32 and rotates in response to the contact, a shaft 38 (FIG. 3) that couples the runner 36 with the generator 34, a turbine-inlet 40 (FIG. 3) that directs the fluid toward the runner 36, and a turbine-outlet 42 (FIG. 3) that directs the fluid away from the runner 36 after the fluid flows through the runner 36.

When the system 30 is coupled to a water pipe (not shown) of a distribution system, the turbine's flange 44 is fastened to a first section of the pipe, and the turbine's flange 46 is fastened to a second section of the pipe. When water flows through the system 30, water flows through the pipe's first section, enters the turbine-inlet 40, and then flows through the turbine-inlet toward the runner 36 in the direction indicated by the arrows 48. The water then flows through the runner 36 causing the runner 36 to rotate the shaft 38 in the direction indicated by the arrow 50. The water then flows through the turbine-outlet 42 away from the runner 36 in the direction indicated by the arrows 52, and then through the pipe's second section.

The turbine-inlet 40 and the turbine-outlet 42 are positioned relative to each other so that fluid flowing toward the runner 36 (arrows 48) flows around and adjacent the fluid flowing away from the runner 36 (arrows 52). In this and other embodiments, the fluid flowing toward the runner 36 splits and surrounds a section of the turbine-outlet's length that is defined by the path that the fluid flowing away from the runner 36 follows from the turbine-outlet's entrance 54 to the turbine-outlet's exit 56. In other embodiments, the fluid flowing toward the runner 36 may not surround a section of the turbine-outlet's length, but rather, may flow around a portion of the turbine-outlet's perimeter. For example, the fluid flowing toward the runner 36 may not split as it flows around the turbine-outlet 42 but instead, the whole flow may flow around one side of the turbine-outlet 42.

By positioning the turbine-inlet 40 relative to the turbine-outlet 42 so that fluid flowing toward the runner 36 flows around and adjacent the fluid flowing away from the runner 36, the turbine-inlet's entrance 58 and the turbine-outlet's exit 56 may be aligned and close to each other. This makes positioning and installing a turbine 32 in a fluid distribution network quick and easy because one can simply insert the turbine 32 between two pipe ends, or remove a section of a pipe to add the turbine 32. Thus, the turbine 32 may be quickly and easily added to a pipe that carries fluid within any distribution system or toward any specific location to extract energy that otherwise would be wasted. Also, in this configuration, a generator 34 may be coupled directly to the turbine's runner 36 to avoid transmitting the rotation of the runner 36 through one or more gears toward the generator 34, which can reduce the amount of power generated by the generator 34. In addition, the turbine 32 may be configured to use a variety of different runners 36, each designed to reduce the pressure in the fluid by a specific amount while efficiently extracting kinetic energy from the fluid. In this manner, one may easily replace the turbine's runner 36 in response to a desired change in the fluid's pressure at the turbine-outlet's exit 56, or to a change in the desired amount of energy to be extracted by the turbine 32.

FIG. 4 shows an exploded, perspective view of the turbine 32 shown in FIGS. 2 and 3, according to an embodiment of the invention. The turbine 32 includes three components, a base 60, a turbine case 62 and a turbine cover 64, that when fastened together as shown in FIG. 2 house the turbine's runner 36, and form the turbine-inlet 40 (FIG. 3) and the turbine-outlet 42 (FIG. 3). The base 60 is shown and discussed in greater detail in conjunction with FIGS. 5-8B. The turbine case 62 is shown and discussed in greater detail in conjunction with FIG. 9. The turbine cover 64 is shown and discussed in greater detail in conjunction with FIG. 10. Although shown as three separate components, the base 60, the turbine case 62, and the turbine cover 64 may be combined into two components. For example, the base 60 and the turbine case 62 may be combined into a single component; similar to the body 135 shown in FIGS. 11 and 12.

Each of these turbine components 60, 62, and 64 may be fastened to its respective neighbor using any desired fastening technique. For example, in this and other embodiments, the turbine case 62 is bolted to the base 60 with twelve bolts (not shown) that are each inserted into a respective one of the holes 66 (only two labeled for clarity) and threaded into a respective one of the twelve holes 68 (only two labeled for clarity). Similarly, the turbine cover 64 is bolted to the turbine case 62 with twenty bolts (not shown) that are each inserted into a respective one of the holes 70 (only two labeled for clarity) and threaded into a respective one of the twenty holes (not shown in FIG. 4 but shown in FIG. 10).

The runner 36 may be any desired runner. For example, in this and other embodiments, the runner 36 is a Francis runner, which works well in a broad range of flow conditions, such as 45 to 400 meters of head and 0.10 to 700 cubic meters per second. A Francis runner extracts kinetic energy from a flowing fluid by absorbing some of the fluid pressure in the flow as the fluid flows through the runner 36. More specifically, the Francis runner 36 is designed to efficiently extract kinetic energy from water flowing through the turbine 32 at 97 meters of head and 0.24 cubic meters per second. The turbine runner 36 includes an entrance 72 that extends around the whole perimeter 74, blades 76, and an exit 78. In operation, water flows through the entrance 72, pushes the blades 76 to cause the runner 36 to rotate clockwise when viewed from the turbine cover 64, and leaves the runner 36 through the exit 78. In other embodiments, the runner 36 may be a Kaplan runner, which, like the Francis runner, is a reaction-type runner, or the runner 36 may be a propeller-type runner whose propeller blades are fixed. In still other embodiments, the runner may be an impulse-type runner, such as a Pelton, a Turgo, or a cross-flow runner. In such embodiments, the turbine 32 may include a nozzle to increase the velocity of the fluid before the fluid hits the runner and transfers some of its momentum to the impulse-type runner.

The turbine 32 also includes an adapter 80 that secures the runner 36 in the turbine case 62, and protects the turbine case 62 from wear caused by the runner's rotation relative to the turbine case 62. The adapter 80 may include any desired material and may be configured as desired. For example, in this and other embodiments the adapter 80 includes a nickel aluminum bronze material per ASTM B148/UNS C95800 and is configured to seal the turbine-inlet 40 (FIG. 3) to the runner 36 so that most of the fluid flowing through the turbine-inlet 40 flows through the runner 36 to generate power. To lubricate the interface between the runner 36 and the adapter 80, a small amount of fluid (here water) is allowed to flow between the runner 36 and the adapter 80. In addition, the adapter 80 allows one to use a runner 36 that is configured for different fluid flow conditions, such as a different sized reaction-type runner or an impulse-type runner. In such a situation, one could remove the current runner 36 and select a different runner 36 for the turbine 32. If the runner has a larger diameter (or a smaller diameter), then one could remove the current adapter 80 and install a different adapter 80 that can accommodate the larger (or smaller) diameter. Or, one may change the runner 36 from a reaction-type runner to an impulse-type runner, and thus, install an adapter 80 configured to secure the impulse-type runner in the turbine case 62.

Still referring to FIG. 4, the turbine 32 also includes a wicket gate 82 to control the amount of fluid flowing through the turbine 32, and thus through the runner 36. The wicket gate 82 may be configured as desired. For example, in this and other embodiments, the wicket gate 82 includes sixteen individual plates 84 (only 3 labeled for clarity) that may be rotated about a respective axis 86 (only 3 labeled for clarity) by a control circuit (not shown). As shown in FIG. 4, each of the sixteen individual plates 84 have been rotated to a closed position, such that the wicket gate 82 prevents much, if not all, water in the turbine-inlet 40 from flowing through the turbine runner 36. To open the wicket gate 82, each of the sixteen individual plates 84 are rotated clockwise when viewed from the turbine cover 64. In this embodiment, each of the plates 84 are rotated the same amount as the other plates 84 so that water entering the turbine runner 36 is equally distributed across the perimeter 74 of the runner 36.

Other embodiments are possible. For example, the turbine 32 may not include a wicket gate; but rather one or more vanes that are fixed (not rotatable about the axis 86) and located at the exit of the turbine inlet 40. The one or more vanes direct the fluid's angle of attack against the runner's blades, and do not control the amount of fluid flowing through the turbine.

Still referring to FIG. 4, the turbine 32 may also include a control circuit (not shown) to open or close the wicket gate 82 as desired. The control circuit senses the fluid pressure in the fluid flowing through the pipe's second section, after the fluid has left the turbine-outlet 42, and in response to the sensed pressure may open, partially open, close, partially close, or maintain the wicket gate's current position. In this manner the control circuit and the wicket gate 82 substantially maintains the desired fluid pressure and/or flow rate through the pipe's second section by regulating the amount of fluid flowing through the turbine's runner 36. Consequently, when the fluid pressure in the pipe's second section changes because flow conditions in other portions of the fluid distribution network change, the control circuit and wicket gate 82 increases or decreases the amount of fluid flowing through the runner 36 to maintain the desired flow characteristics in the pipe's second section. For example, if fluid pressure in the pipe's second section increases, the control circuit closes the wicket gate 82 to reduce or stop the flow of fluid through the runner 36. Conversely, when the fluid pressure decreases in the pipe's second section, the control circuit opens the wicket gate 82 to increase the flow of fluid through the turbine's runner 36.

In this and other embodiments of the turbine 32, the control circuit includes a distribution ring 88 that is coupled to each of the plates 84 of the wicket gate 82, and can rotate each plate 84 the same amount and at the same time. In this manner, the control circuit only needs to rotate the distribution ring a desired amount in response to the fluid pressure sensed in the pipe's second section to open or close the wicket gate 82.

Other embodiments are possible. For example, the control circuit may not directly control the opening or closing of the wicket gate 82, but rather sense and then display the fluid pressure. One may then see the displayed fluid pressure and then physically open or close the wicket gate 82 in response. For another example, the control circuit may monitor one or more flow characteristics in the fluid flowing through the pipe's first section, before the fluid has entered the turbine-inlet 42. This may be desirable when the fluid flowing toward the turbine 32 should have one or more flow characteristics maintained. For another example, the control circuit may monitor the amount of power generated by the generator 34 and open or close the wicket gate 82 in response. This may be desirable when the flow characteristics of the fluid flowing through both of the pipe's sections do not need to be maintained at a certain level.

Still referring to FIG. 4, the turbine 32 may also include a generator mount 90 that supports the generator 34 relative to the turbine's runner 36 while the shaft 38 rotates.

FIG. 5 shows a cross-sectional view of the base component 60 shown in FIGS. 3 and 4, according to an embodiment of the invention. Each of FIGS. 6 and 7 shows a view of the base component 60 shown in FIG. 5, according to an embodiment of the invention. And each of FIGS. 8A and 8B shows a partial, cross-sectional view of the base component shown in FIGS. 5-7, according to an embodiment of the invention.

As previously mentioned and shown, the base 60 forms a portion of the turbine-inlet 40 and all of the turbine-outlet 42. The turbine-inlet 40 and the turbine-outlet 42 are positioned relative to each other so that fluid flowing in the direction indicated by the arrows 48 (toward the runner 36) flows around and adjacent the fluid flowing in the direction indicated by the arrows 52 (away from the runner 36). By positioning the turbine-inlet 40 relative to the turbine-outlet 42 in this manner, the entrance 58 of the turbine-inlet 40 and the exit 56 of the turbine-outlet 42 may be located close to and parallel with each other.

For example, in this and other embodiments the entrance 58 and the exit 56 are parallel and aligned. More specifically, the entrance 58 has a circular cross-section 92 whose area lies perpendicular to the direction of the fluid flowing through it indicated by the arrow 48. The circular cross-section 92 has a center and includes an axis 94 located at the center and perpendicular to the area of cross-section 92. Likewise, the exit 56 has a circular cross-section 96 whose area lies perpendicular to the direction of the fluid flowing though the exit 56 indicated by the arrow 52. The circular cross-section 96 also has a center and also includes an axis 98 located at the center and perpendicular to the area of the cross-section 96. In this and other embodiments, the axis 94 of the entrance 58 is aligned with the axis 98 of the exit 56. Moreover, in this and other embodiments, the longitudinal axis of the pipe's first section that is fastened to the flange 44 is aligned with the axis 94 of the entrance 58. The longitudinal axis of the pipe's second section that is fastened to the flange 46 is aligned with the axis 98 of the exit 56. And, the longitudinal axis 99 of the runner 36 (FIGS. 3 and 4), which is also the longitudinal axis of the shaft 38 (FIG. 3), intersects perpendicularly the aligned axes 94 and 98.

Other embodiments are possible. For example, the entrance 58 and exit 56 may not be parallel to each other but rather angled relative to each other. More specifically, the axis 94 of the entrance 58 may not be aligned with the axis 98 of the exit 56, but rather, the axis 94 may intersect the axis 98 at any desired angle, or the axis 94 may lie parallel to the axis 98. As another example, the cross-section 92 of the entrance 58 and/or the cross-section 96 of the exit 56, may be any shape other than circular, such as oval and square. As another example, the longitudinal axis 99 may intersect the aligned axes 94 and 98 at an angle other than 90 degrees, or the longitudinal axis 99 may not intersect either of the axes 94 or 98.

Still referring to FIG. 5, the turbine inlet 40 may be configured as desired. For example, in this and other embodiments, the turbine inlet 40 is configured to maintain the speed of the fluid as it flows toward the runner 36 (FIGS. 3 and 4). More specifically, the turbine inlet 40 includes a series of cross sections, each oriented perpendicular to the direction of the fluid's flow at the cross section. Each of the cross sections is similar to the cross section 92, except that their respective shape is different based on their respective location in the turbine inlet 40, so that the area of each cross section is the same or substantially the same as the area of the cross section 92. Thus, in this and other embodiments, the turbine inlet's entrance 58 has a circular cross section 92 and as the turbine-inlet 40 approaches the turbine case 62 (FIG. 4), the cross section 100 becomes a ring having an inside diameter and an outside diameter but whose area is the same as the area of the cross section 92. In addition, the turbine inlet 40 does not include an abrupt change in direction but does include a smooth, interior surface 102.

Still referring to FIG. 5, in this and other embodiments, the turbine-inlet 40 also includes a flow divider 104 to help distribute the fluid flowing through the turbine-inlet 40 more evenly across the turbine-inlet's exit where the plates 84 of the wicket 82 are located (FIGS. 3 and 4). The flow divider 104 may be configured as desired to accomplish this function. For example, in this and other embodiments as shown in FIGS. 6, 8A and 8B, the flow divider 104 basically looks like a curved, two-pronged fork and is positioned in the turbine-inlet 40 to direct some of the fluid flowing through the turbine-inlet's entrance 58 toward a first region 106 (FIGS. 5, 8A and 8B) of the turbine-inlet 40.

Similar to the turbine-inlet 40, the turbine-outlet 42 may be configured as desired. For example, in this and other embodiments, the turbine-outlet 42 is configured to slow down the flow of fluid leaving the runner 36 without generating any additional turbulence in the flow—that is, maintain or reduce the amount of turbulence in the flow leaving the runner 36. Because, in these embodiments, the flow through the runner 36 (FIGS. 3 and 4) is faster than the flow through the pipe's second portion, the turbine-outlet 42 helps slow down the fluid leaving the runner 36 so that the speed of the flow leaving the turbine-outlet's exit 56 matches or closely matches the speed of the flow through the pipe's second section. More specifically, the turbine-outlet 42 includes a series of cross-sections, each oriented perpendicular to the direction of the fluid's flow at the cross-section. Each of the cross-sections is similar to the cross-section 96, and each has area that is less than the area of the cross-section 96. How much less depends on the location of the specific cross-section relative to the location of the cross-section 96. As the specific cross-section gets closer to the cross-section 96, the specific cross-section's area approaches the area of the cross-section 96. In this and other embodiments, the specific cross-section's area changes linearly relative to the specific cross-section's location in the turbine-outlet 42. The turbine-outlet's exit 56 has a circular cross-section 96 and as the turbine-outlet 42 approaches the exit 56, the cross-section 108 remains circular and has an area that increases but remains less than the area of the cross-section 96. In addition, the turbine-outlet 42 does not include an abrupt change in direction but does include a smooth, interior surface 110.

Still referring to FIG. 5, in this and other embodiments, the turbine-outlet 42 also includes a draft tube 112 at the turbine-outlet's entrance 114 whose cross-sectional area increases more rapidly than the cross-sectional areas downstream in the turbine-outlet 42. More specifically, the draft tube 112 has a diameter that increases as the draft tube 112 extends away from the runner 36. This helps slow down the flow of the fluid through the turbine-outlet 42 and into the pipe's second portion.

Still referring to FIG. 5, the base 60 may include any desired material. For example, in this and other embodiments the base 60 includes ductile iron per ASTM A536 Grade 65-45-12 that is initially cast and then machined to the correct dimensions.

FIG. 9 shows a cross-sectional view of the case component 62 of the turbine 32 shown in FIGS. 3 and 4, according to an embodiment of the invention. As previously mentioned and shown, the case 62 helps house the turbine's runner 36 (FIGS. 3 and 4) and forms a portion 116 of the turbine-inlet 40.

The portion 116 of the turbine-inlet 40 may be configured as desired. For example, in this and other embodiments, the portion 116, like the portion of the turbine-inlet 40 formed by the base 60, is configured to maintain the speed of the fluid as it flows toward the runner 36 (FIGS. 3 and 4). More specifically, the portion 116 of the turbine-inlet 40 includes a series of cross-sections (only two shown, 118 and 120), each oriented perpendicular to the direction of the fluid's flow at the cross-section. Each of the cross-sections (118 and 120) is similar to the other cross-sections, except that their respective shape is different based on their respective location in the portion 116 of turbine-inlet 40, so that the area of each cross-section is the same or substantially the same as the area of the other cross-sections. In addition, the portion of the turbine-inlet 40 does not include an abrupt change in direction but does include a smooth, interior surface 120.

Also similar to the base 60, the case 62 may include any desired material. For example, in this and other embodiments the base 60 includes ductile iron per ASTM A536 Grade 65-45-12 that is initially cast and then machined to the correct dimensions.

FIG. 10 shows a cross-sectional view of the cover component 64 of the turbine 32 shown in FIGS. 3 and 4, according to an embodiment of the invention. As previously mentioned and shown, the case 64 helps house the turbine's runner 36 (FIGS. 3 and 4) and also forms a portion 122 of the turbine-inlet 40. The portion 122 forms half of the turbine-inlet's exit where the plates 84 of the wicket 82 are located (FIGS. 3 and 4). The other half of the turbine-inlet's exit is formed by the adapter 80 (FIGS. 3 and 4) and a tip 123 (FIG. 9) of the case 62. Similar to the portions of the turbine-inlet 40 formed by the base 60 and the case 62, the portion 122 may be configured as desired. For example, in this and other embodiments, the portion 12 is configured to maintain the speed of the fluid as it flows toward the runner 36 (FIGS. 3 and 4) when the portion 122 is combined with the adapter 80 and the case's tip 123. In addition, the portion 122 of the turbine-inlet 40 includes a smooth, interior surface 124.

Also similar to the base 60 and the case 62, the cover 64 may include any desired material. For example, in this and other embodiments the base 60 includes ductile iron per ASTM A536 Grade 65-45-12 that is initially cast and then machined to the correct dimensions.

FIG. 11 shows a view of another system 130, according to another embodiment of the invention. FIG. 12 shows a cross-sectional view of a base component 132, according to an embodiment of the invention, that the system 130 includes. The system 130 also includes a generator 134. The system 130 is similar to the system 30 (FIGS. 3 and 4) except that the system 130 includes a body 135 that incorporates the turbine case, and is configured to generate less electricity from less fluid flowing through the system 130. Thus, the system 130 may be desired for networks that distribute less fluid than the network that the system 30 would be used in.

When fluid (not shown) flows through the system 130, fluid enters the turbine-inlet 136 through the entrance 138 and then flows through the turbine-inlet in the direction indicated by the arrows 140. The fluid then flows through the turbine's runner (not shown). Then, the fluid flows through the turbine-outlet 142 in the direction indicated by the arrows 144 and then out through the exit 146.

Both the turbine-inlet 136 and the turbine-outlet 142 may be configured as desired. More specifically, similar to the turbine-inlet 40 of the system 30, the turbine-inlet 136 is configured to maintain the speed of the fluid as it flows toward the runner. And, similar to the turbine-outlet 42 of the system 30, the turbine-outlet 142 is configured to slow down the flow of fluid leaving the runner while maintaining laminar flow conditions.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A turbine for extracting kinetic energy from a fluid, the turbine comprising:
    a runner that, when fluid flows through the turbine, contacts the flowing fluid and rotates in response to the contact to extract kinetic energy from the fluid flowing through the turbine;
    a turbine outlet that, when fluid flows through the turbine, directs the flowing fluid away from the runner, the turbine outlet having an entrance adjacent the runner, and an exit; and
    a turbine inlet that, when fluid flows through the turbine, directs the flowing fluid into the runner, the turbine inlet having:
        an exit adjacent the turbine's runner, and an entrance, wherein fluid flowing through the turbine inlet toward the turbine's runner flows around and adjacent the fluid flowing through the turbine outlet away from the turbine's runner, and
        a divider in the shape of a two-pronged fork and positioned in the turbine inlet such that, when fluid flows through the entrance of the turbine inlet, the divider diverts some of the flow toward a first region of the turbine inlet's exit.

2. The turbine of claim 1 wherein, when fluid flows through the turbine, the fluid includes water.

3. The turbine of claim 1 wherein the runner includes a Francis turbine runner.

4. The turbine of claim 1 wherein the turbine includes a wicket gate operable to control the amount of fluid flowing through the turbine.

5. The turbine of claim 1 wherein:
    the exit of the turbine outlet has an axis,
    the entrance of the turbine inlet has an axis, and
    the axis of the turbine outlet's exit and the axis of the turbine inlet's entrance are parallel.

6. The turbine of claim 1 wherein:
    the exit of the turbine outlet has an axis,
    the entrance of the turbine inlet has an axis, and
    the axis of the turbine outlet's exit and the axis of the turbine inlet's entrance are aligned.

7. The turbine of claim 1 wherein:
    the exit of the turbine outlet has an axis,
    the entrance of the turbine inlet has an axis,
    the runner has an axis, and
    the axis of the turbine outlet's exit and the axis of the turbine inlet's entrance both intersect the axis of the runner at 90 degrees.

8. The turbine of claim 1 wherein the turbine inlet's exit surrounds the turbine's runner.

9. The turbine of claim 1 wherein, when fluid flows through the turbine, the fluid flowing through the turbine inlet surrounds the fluid flowing through the turbine outlet.

10. The turbine of claim 1 wherein:
    when fluid flows through the turbine, the flow through the turbine inlet has a velocity, and
    the turbine inlet is configured to maintain the flow through the turbine inlet at a constant velocity.

11. The turbine of claim 1 wherein:
when fluid flows through the turbine, the flow through the turbine outlet has a velocity, and
the turbine outlet is configured to slow the flow through the turbine outlet.

12. The turbine of claim 1 wherein:
when fluid flows through the turbine, the flow has a velocity, and
the turbine outlet includes a draft tube to reduce the velocity in the flow at the turbine-outlet's entrance.

13. A method for generating power from kinetic energy in a fluid, the method comprising:
fluid flowing through a turbine contacting a runner of the turbine and rotating the runner in response to the contact;
directing, via a turbine outlet, the flowing fluid away from the turbine's runner after the fluid contacts the turbine's runner, the turbine outlet having an entrance adjacent the turbine's runner, and an exit;
directing, via a turbine inlet, the flowing fluid toward the turbine's runner, around and adjacent the fluid flowing through the turbine outlet, the turbine inlet having an entrance, and an exit adjacent the turbine's runner; and
diverting, via a divider in the shape of a two-pronged fork positioned in the turbine inlet, some of the fluid flowing in the turbine inlet toward a first region of the turbine inlets exit.

14. The method of claim 13 wherein directing the flowing fluid toward the turbine's runner includes surrounding the fluid flowing through the turbine outlet.

15. The method of claim 13 wherein:
the turbine inlet directing the flowing fluid toward the turbine's runner includes receiving the flowing fluid through the turbine inlet's entrance having an axis, and
the turbine outlet directing the flowing fluid away from the turbine's runner includes directing the flowing fluid through the turbine outlet's exit having an axis, wherein the axis of the turbine outlet's exit and the axis of the turbine inlet's entrance are parallel.

16. The method of claim 13 wherein:
the turbine inlet directing the flowing fluid toward the turbine's runner includes receiving the flowing fluid through the turbine inlet's entrance having an axis, and
the turbine outlet directing the flowing fluid away from the turbine's runner includes directing the flowing fluid through the turbine outlet's exit having an axis, wherein the axis of the turbine outlet's exit and the axis of the turbine inlet's entrance are aligned.

17. The method of claim 13, wherein directing the flowing fluid toward the turbine's runner includes maintaining the speed of the flow through the turbine inlet at a constant velocity.

18. The method of claim 13, wherein directing the flowing fluid away from the turbine's runner includes slowing the speed of the flow through the turbine outlet.

19. The method of claim 13, wherein rotating the turbine's runner in response to contact with a fluid flowing through the turbine includes modifying the amount of fluid flowing through the turbine.

20. The method of claim 13, wherein directing the flowing fluid away from the turbine's runner includes reducing the velocity of the flowing fluid at the turbine outlet's entrance.

21. A system for generating electrical power, the system comprising:
a turbine for extracting kinetic energy from a fluid, the system including:
a runner that, when fluid flows through the turbine, contacts the flowing fluid and rotates in response to the contact to extract kinetic energy from the fluid flowing through the turbine;
a turbine outlet that, when fluid flows through the turbine, directs the flowing fluid away from the runner, the turbine outlet having an entrance adjacent the runner, and an exit; and
a turbine inlet that, when fluid flows through the turbine, directs the flowing fluid into the runner, the turbine inlet having:
an exit adjacent the turbine's runner, and an entrance, wherein fluid flowing through the turbine inlet toward the turbine's runner flows around and adjacent the fluid flowing through the turbine outlet away from the turbine's runner; and
a divider in the shape of a two-pronged fork and positioned in the turbine inlet such that, when fluid flows through the entrance of the turbine inlet, the divider diverts some of the flow toward a first region of the turbine inlet's exit; and
a generator coupled to the turbine's runner and operable to convert rotation of the turbine's runner into an electric potential.

22. The system of claim 21 wherein the runner includes a Francis turbine.

23. The system of claim 21 wherein the generator generates an alternating electric potential.

* * * * *